No. 700,732. Patented May 27, 1902.
B. W. BRYAN.
PLANIMETER.
(Application filed Oct. 8, 1901.)
(No Model.) 5 Sheets—Sheet 3.
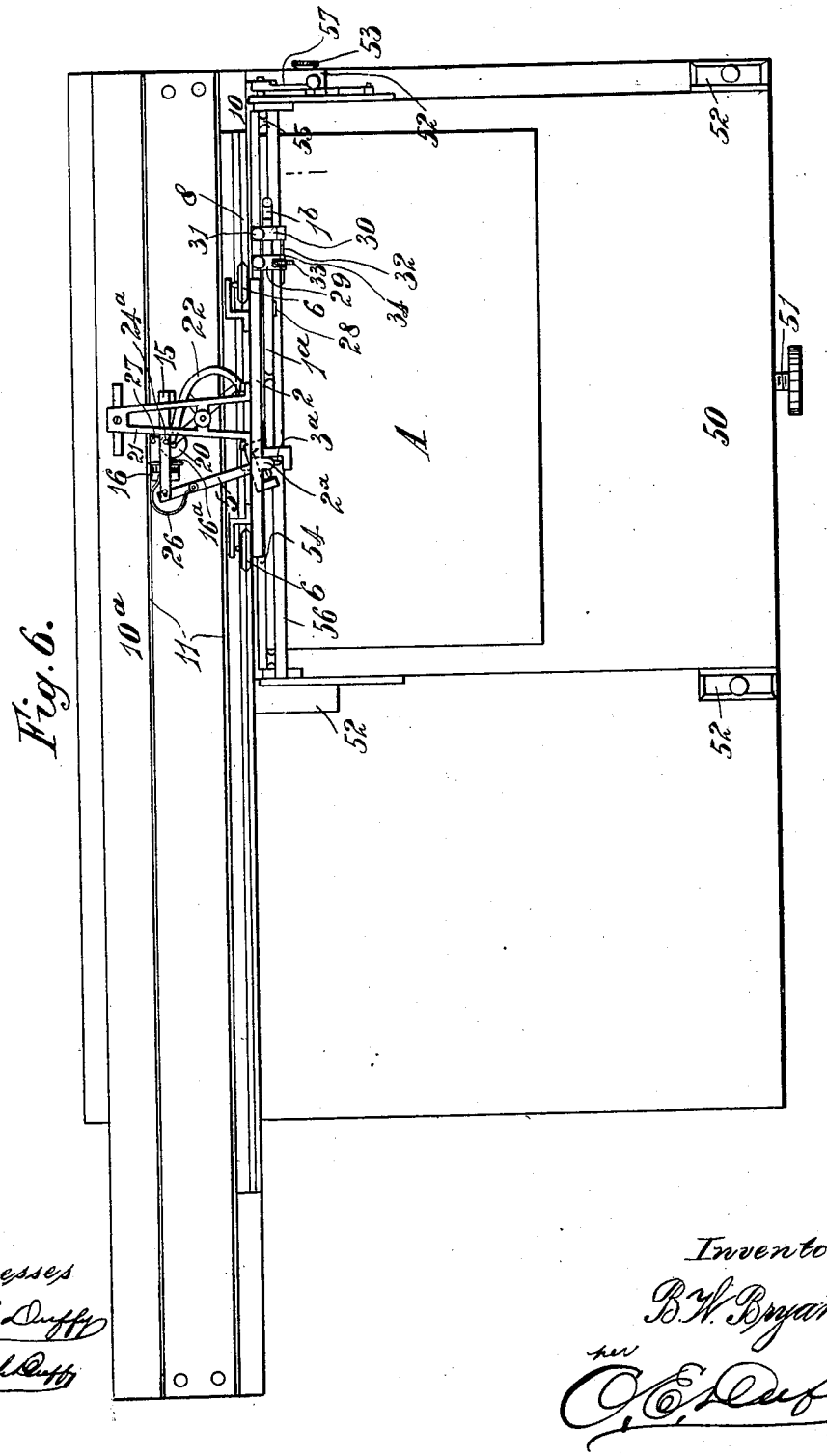

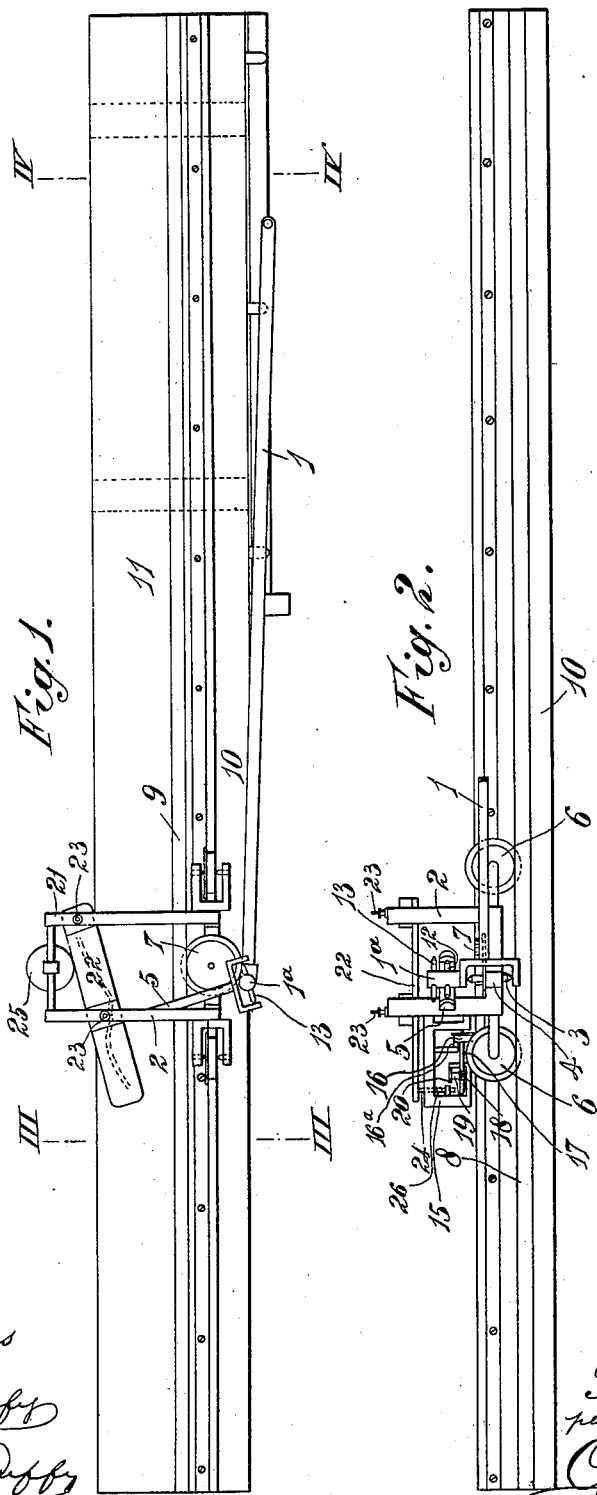

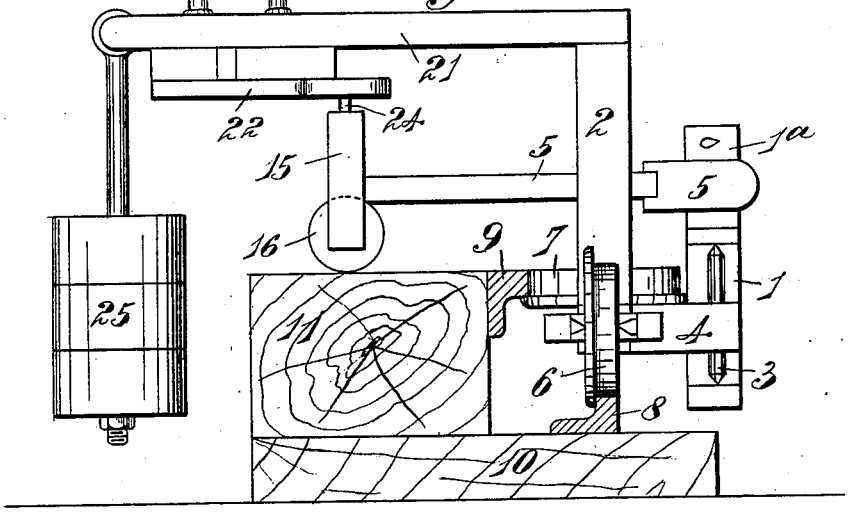
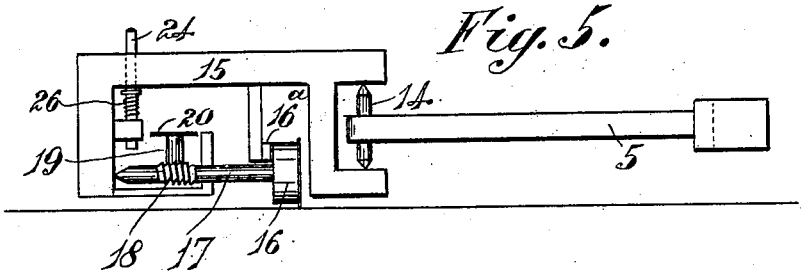
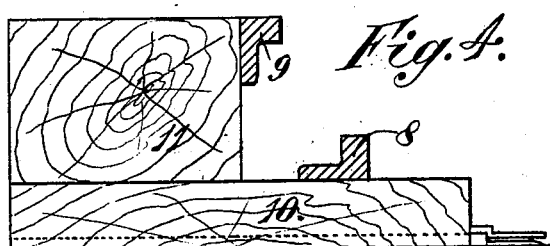

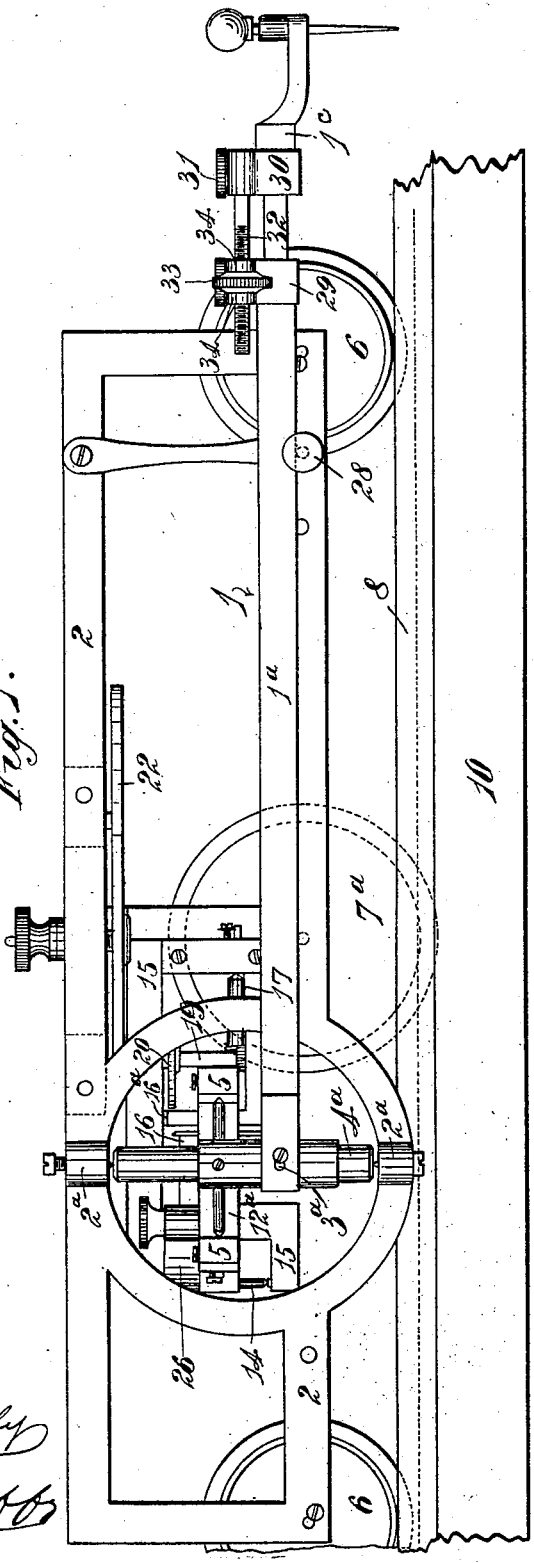

No. 700,732. Patented May 27, 1902.
B. W. BRYAN.
PLANIMETER.
(Application filed Oct. 8, 1901.)
(No Model.) 5 Sheets—Sheet 5.

Witnesses
E. C. Duffy
C. Hugh Duffy

Inventor.
B. W. Bryan,
per O. E. Duffy
Atty.

UNITED STATES PATENT OFFICE.

BERNARD WILLIAM BRYAN, OF BUCKHURST HILL, ENGLAND.

PLANIMETER.

SPECIFICATION forming part of Letters Patent No. 700,732, dated May 27, 1902.

Application filed October 8, 1901. Serial No. 78,028. (No model.)

*To all whom it may concern:*

Be it known that I, BERNARD WILLIAM BRYAN, a subject of the King of Great Britain and Ireland, residing at Buckhurst Hill, in the county of Essex, England, have invented Improvements in Planimeters, of which the following is a specification.

Planimeters such as heretofore usually employed will not integrate correctly when the values of the ordinates of the curve, diagram, or other figure to be computed are not proportional to their height or length—that is to say, when the scale of the diagram varies at different parts thereof.

Now this invention has for its object to obviate this serious disadvantage and to provide a planimeter that will directly calculate in a practically accurate manner totals and averages from an unequally-divided curve, diagram, or other figure recording any given result. For this purpose in a planimeter according to this invention the frame or holder that is moved by the tracing-arm of the instrument and in which the counting-wheel and index-roller are mounted to revolve instead of being fixed to the tracing-arm, as heretofore, is connected to the said arm in such a way that it can turn relatively thereto, and in conjunction with such frame or holder there is provided means adapted to control its movements, and consequently those of the counting-wheel and index-roller, in such a way as to correct or compensate for any want of uniformity in the scale of different parts of the curve, diagram, or other figure (hereinafter called a "diagram") to be computed, so that the instrument shall give a direct and correct integration of the diagram notwithstanding such want of uniformity of scale. The controlling means may conveniently be in the form of a cam, the shape of which is dependent upon the nature of the variable scale of the diagram to be computed.

The invention is applicable to planimeters of various types for computing diagrams of various kinds.

Figure 8:
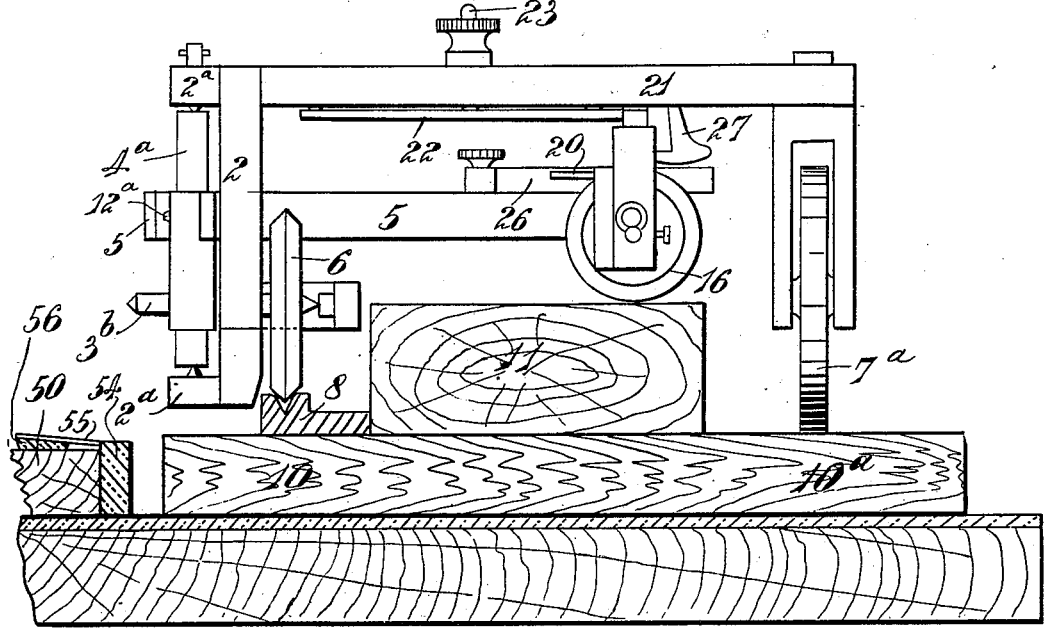
Figure 9:
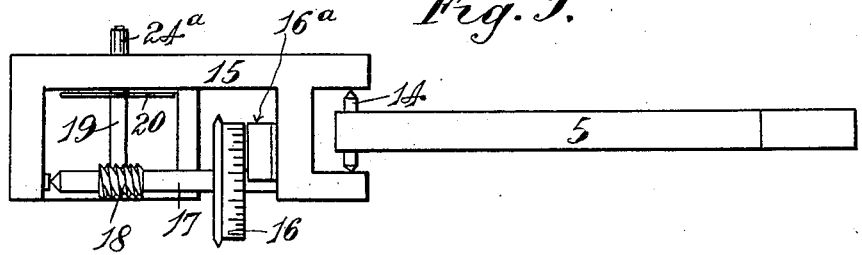

In the accompanying illustrative drawings, Figure 1 is a plan, Fig. 2 a front elevation, Fig. 3 a cross-section corresponding to the line III of Fig. 1, Fig. 4 a cross-section corresponding to the line IV of Fig. 1, and Fig. 5 an elevation, of the planimeter removed from the board with its parts in a position differing from that of Fig. 1. Fig. 6 is a plan of an instrument of somewhat-modified construction and applied to a board for carrying the record-sheet. Fig. 7 is a front elevation, Fig. 8 a cross-section corresponding to the line VIII of Fig. 6, and Fig. 9 an elevation, of the planimeter with its parts in a position differing from that of Fig. 6.

According to the construction of planimeter which is illustrated in Figs. 1 to 5 and which is specially designed for computing from "rate-of-flow" diagrams the quantity of liquid passed in any given time through meters, such as Deacon's meters, and orifices, over weirs, &c, but capable also of computing totals and averages from other diagrams representing various records and each drawn to a varying scale, the tracing-arm 1, carrying at one end the tracing handle and point, is jointed at its other end to a longitudinally-movable frame or carrier 2 in such a manner as to turn about a vertical axis. For this purpose the pivoted end of the tracing-arm 1 is bifurcated and is mounted to turn about a vertical pin 3, that is fixed in a support 4 on the frame or carrier 2. The frame or carrier 2 is provided, as shown, with vertical and horizontal flanged rollers 6 and 7, mounted in suitable bearings and arranged to run, respectively, on and against lower and upper longitudinal guide-rails 8 and 9, that are secured, respectively, upon a longitudinal base-piece 10 and to one side of a raised table or platform 11, fixed upon the said base-piece 10. To the bifurcated end of the tracing-arm 1 is pivoted, so as to turn about a horizontal axis, one end of another arm 5, hereinafter called, for distinction, the "planimeter-arm," which is arranged at a fixed angle, usually an obtuse angle, to the tracing-arm 1 and extends backward over the top of the table or platform 11. For pivoting the two arms 1 and 5 together the bifurcated end of the tracing-arm 1 is provided with an upper vertical extension 1ª, carrying two horizontal pivot-pins 12 and 13, which are suitably arranged one above the other, and on one or other of which pins the adjacent end of the planimeter-arm 5, which is bifurcated, is mounted, according as the instrument is to be used for computing the quantity of water that has passed through a meter or over a weir. To the other end of the planimeter-arm 5 is jointed, by means of a vertical pin 14, so as to turn about a vertical axis, one end of a vertical frame or holder 15, in which is mounted in the usual manner an ordinary index-roller 16, fixed to a horizontal spindle 17, that drives, through worm-gearing 18, a vertical spindle 19, carrying an ordinary counting-wheel 20. The frame 15 is also provided, as usual, with a fixed vernier $16^a$ adjacent to the index-roller 16 and with a fixed line or indicator adjacent to the counting-wheel 20 and is so arranged that the index-roller 16 will travel over the top of the table or platform 11, which is preferably covered with material, such as hard dull cardboard or paper, for the index-roller 16 to work upon. The traveling frame or carrier 2 has a lateral extension 21, that overhangs the table or platform 11 and to which a horizontal plate 22 is detachably fixed by means of screws 23, which pass through the plate and the lateral extension and are secured by clamping-nuts $23^a$. This plate 22 is formed on its under surface with a cam-groove, with which engages a vertical pin 24, that is carried by the pivoted frame or holder 15. The cam-plate 22 and the pin 24 are kept in engagement with each other and the roller 7 kept in contact with the rail 9, and thereby the index-roller 16 in proper contact with the table or platform 11, by means, respectively, of a spring 26, that encircles the pin 24, and of a weight 25, that is suspended from the lateral extension 21. The cam-groove in the cam-plate 22 is shaped so as to suit the varying scale of the diagram to be computed, and the cam-plate 22 is suitably set to cause the groove therein to control the movements of the pivoted frame or holder 15 in the required manner. The cam-plate 22 may be a metal strip set at an angle, as shown, to the longitudinal direction of the base-board 10, the cam-groove extending generally in the direction of the length of the strip.

According to the construction of planimeter illustrated in Figs. 6 to 9 the tracing-arm 1 of the apparatus is telescopic and comprises a hollow or tubular portion $1^b$, within which telescopes another portion $1^c$, carrying at its outer end the tracing handle and point. The length of the tracing-arm 1 can therefore be made greater or less in order to suit diagrams of various sizes. The other end of the tracing-arm 1 is bifurcated, as in the previously-described arrangement; but instead of being mounted so as to turn about a vertical axis only the construction is such that the tracing-arm can be rotated about both a horizontal axis and also about a vertical axis. For this purpose the tracing-arm is mounted on a horizontal pin $3^a$, that is secured to a vertical pin $4^a$, mounted in adjustable bearings $2^a$ in the frame or carrier 2. The end of the planimeter-arm 5 instead of being pivoted to an upward extension of the tracing-arm is mounted on a horizontal pin $12^a$, that is also secured to the vertical pin $4^a$. The frame or carrier 2 is provided with vertical wheels 6 and $7^a$, mounted in bearings $6^a$ and $7^b$ and arranged to run, respectively, on a longitudinal guide-rail 8, secured upon the longitudinal base-piece 10, and on an extension $10^a$ of the base 10 at the rear of the raised table or platform 11.

In the example now being described the horizontal cam-plate 22 is not provided with a cam-groove on its under surface, as in the example hereinbefore described; but its outer edge is formed as a cam-surface, with which an antifriction-roller $24^a$, carried by the pin 24, is held in contact by means of the spring 26, one end of which is secured to the planimeter-arm 5 by a clamping-nut $26^a$, while the other end bears against a slide-block on the frame or holder 15. The outer end of the tubular or hollow portion $1^b$ of the tracing-arm 1 has secured to it a clip 29, while on the portion $1^c$ there is a clip 30, that is movable longitudinally thereof and is secured in position by means of a clamping-screw 31. These two clips 29 and 30 are connected together by means of a screw 32, having a fine thread and carrying a milled nut 33, kept in position by means of two projections 34 on the clip 29.

When it is desired to alter the length of the tracing-arm 1, the clamping-screw 31 of the clip 30 is unscrewed, so as to loosen the grip of the clip on the portion $1^c$, which portion is then pushed into or pulled out of the portion $1^b$ until the tracing-arm is approximately of the desired length. The clip 30 is then clamped to the portion $1^c$ and the total length of the tracing-arm 1 accurately adjusted by means of the screw 32 and milled nut 33, which form a micrometer adjustment.

The lateral extension 21 (which conveniently, as shown, may be triangular in plan) of the frame or carrier 2 has pivoted to it at one side a catch 27, that when desired can be engaged with the frame or holder 15, so as to hold the index-roller 16 clear of the top of the table or platform 11 and also to secure the planimeter-arm 5 and the other parts of the apparatus from movement when out of use. To aid in this object, the frame or carrier 2 also carries a stop 28, that is pivoted thereto at $28^a$, and upon which the tracing-arm 1 can be placed.

To enable a record-sheet A with a diagram thereon to have its zero-line accurately adjusted to the zero position of the tracing-point, the base-board 10 has preferably mounted on it, as shown, a board 50, which can be adjusted on the board 10 by means of a screw 51 and is guided by pieces 52, one of which is furnished with a clamp 53 for securing the board 50 in any desired position. To enable the record-sheet A to be easily fixed to the board 50, the latter is in the example provided with a longitudinal piece 54, to which are fixed a few spring-plates 55, so as to carry a thin longitudinal strip 56, having a beveled outer edge. The strip 56, which is provided with a few short pins, can be slightly raised by means of a lifting device 57, so that the zero edge portion of the record-sheet A can be placed between the longitudinal strip 56 and the board 50, the longitudinal strip being held down on the record-sheet by means of the spring-plates 55 and the record-sheet maintained stationary by the pins, which pierce the paper, when the lifting device is released and the longitudinal strip 56 pressed down by the spring-pressure. The diameter of the index-roller and the scale thereon are adapted to suit the diagram to be integrated. Thus in the case of a meter diagram, where nineteen inches equal the length of the diagram for a maximum flow of forty-five thousand gallons per hour for twenty-four hours, corresponding to a total flow of one million eighty thousand gallons, if it be required that one revolution of the roller shall register one hundred thousand gallons the roller must revolve 10.80 times in nineteen inches and must therefore have a circumference of 1.7592 inches. This circumference of the index-roller may be divided into one hundred parts, each of which is adapted to be subdivided by the vernier into tenths, and the counting-wheel may be arranged to record up to ten complete revolutions of the index-roller, so that the instrument will read down to one hundred gallons and up to one million or to any number above this by marking or noting the number of complete revolutions of the counting or tens wheel.

In the case of a weir diagram, where ten inches equal the length of the diagram for a maximum flow of water of a depth of fourteen inches over the weir, equal to 269.55 cubic feet per minute per foot width of weir, if it be required that one revolution of the index-roller shall register one hundred cubic feet the roller must make 2.6955 revolutions in ten inches and have a circumference of 3.71 inches. This circumference may be divided into one hundred parts, each of which is adapted to be subdivided by the vernier into tenths, so that the instrument is adapted to read down to 0.1 cubic foot per minute per foot width of weir.

A differently-shaped cam groove or surface must be used for each different varying scale of diagram, and the length of the tracing-arm when a telescopic arm is employed must be adjusted for each cam employed. The shape of the cam groove or surface required for any given diagram-scale may be ascertained as follows: A record-sheet is secured in position on the board, and the tracing-point is placed on one of the horizontal lines of the sheet and drawn therealong from end to end of the sheet, and a stylus, substituted for the pin that bears on the cam-surface or engages in the cam-groove, is adjusted until the apparatus gives an indication corresponding to the horizontal line in question, when the position of the stylus is accurately recorded on a celluloid or similar sheet secured to the lateral extension of the frame or carrier 2. Similar operations are gone through in respect of a number of other horizontal lines of the record-sheet, and the points so formed indicative of the several positions of the axis of the pin are joined together by a line which gives with an accuracy dependent on the number of horizontal lines taken, the desired shape of the cam groove or surface.

What I claim is—

1. A planimeter comprising a tracing-arm, an index-roller, and means for automatically varying the inclination of the axis of the said index-roller to the said tracing-arm to compensate for variation in a diagram-scale.

2. A planimeter comprising a pivotally-mounted tracing-arm, means for guiding the pivot of the said arm rectilineally, an index-roller connected to the said tracing-arm so as to be moved partly rectilineally and partly radially therewith, and means for automatically varying the inclination of the axis of the said index-roller to the said tracing-arm to compensate for variation in a diagram-scale.

3. A planimeter comprising a pivotally-mounted tracing-arm, means for guiding the pivot of the said arm rectilineally, an index-roller connected to the said tracing-arm so as to be moved partly rectilineally and partly radially therewith, and a cam for varying the inclination of the axis of the said index-roller to the said tracing-arm to compensate for variation in a diagram-scale.

4. A planimeter comprising a pivotally-mounted tracing-arm, means for guiding the pivot of the said arm rectilineally, an index-roller connected to the said tracing-arm so as to be moved partly rectilineally and partly radially therewith, and a cam and a spring for varying the inclination of the axis of the said index-roller to the said tracing-arm to compensate for variation in a diagram-scale.

5. A planimeter comprising a pivotally-mounted tracing-arm, means for guiding the pivot of the said arm rectilineally, a planimeter-arm connected to the said tracing-arm so as to move therewith about the pivotal axis thereof, a frame or holder jointed to the said planimeter-arm, an index-roller mounted in the said frame or holder, and means for varying the inclination of the axis of the said index-roller to the said planimeter-arm to compensate for variation in a diagram-scale.

6. A planimeter comprising a pivotally-mounted tracing-arm, means for guiding the pivot of the said arm rectilineally, a planimeter-arm connected to the said tracing-arm so as to move therewith about the pivotal axis thereof, a frame or holder jointed to the said planimeter-arm, an index-roller mounted in the said frame or holder, and a cam for varying the inclination of the axis of the said index-roller to the said planimeter-arm to compensate for variation in a diagram-scale.

7. A planimeter comprising a pivotally-mounted tracing-arm, means for guiding the pivot of the said arm rectilineally, a planimeter-arm connected to the said tracing-arm so as to move therewith about the pivotal axis thereof, a frame or holder jointed to the said planimeter-arm, an index-roller mounted in the said frame or holder, and a cam and a spring for varying the inclination of the axis of the said index-roller to the said planimeter-arm to compensate for variation in a diagram-scale.

8. A planimeter comprising a tracing-arm, a rectilineally-guided frame or carrier to which the said arm is pivoted, a planimeter-arm carried by the said frame or carrier, an index-roller, a frame or holder in which the said roller is mounted, means for varying the inclination of the said frame or holder to the said planimeter-arm, and wheels on which the said frame or carrier is and which are arranged on opposite sides thereof.

Signed at 77 Cornhill, London, England, this 25th day of September, 1901.

BERNARD WILLIAM BRYAN.

Witnesses:
PERCY E. MATTOCKS,
EDMUND S. SNEWIN.